United States Patent [19]
Chiaramonte et al.

[11] 4,091,871
[45] May 30, 1978

[54] HORSESHOES MADE FROM TITANIUM ALLOY COMPOSITIONS

[76] Inventors: Mildred Chiaramonte, 305 E. 86th St., New York, N.Y. 10028; Leonard E. Preiss, Sr., 503 Onderdonk Ave., Ridgewood, Queens, N.Y. 11237

[21] Appl. No.: 598,119

[22] Filed: Jul. 22, 1975

[51] Int. Cl.$^2$ .............................................. A01L 1/02
[52] U.S. Cl. ...................................................... 168/4
[58] Field of Search ...................... 168/4, 24, DIG. 1; 75/175.5; 273/72 A, 73 H; 280/11.13 M, 11.18, 11.12; 36/2.5 A, 2.5 G

[56] References Cited

U.S. PATENT DOCUMENTS

| | | | |
|---|---|---|---|
| 2,197,166 | 4/1940 | Wheeler et al. | 168/4 |
| 3,258,335 | 6/1966 | Hatch | 75/175.5 |
| 3,548,947 | 12/1970 | Mackay-Smith | 168/DIG. 1 |

FOREIGN PATENT DOCUMENTS 2,129,473  1/1972  Germany ............................ 75/175.5

Primary Examiner—Russell R. Kinsey
Assistant Examiner—Robert P. Swiatek
Attorney, Agent, or Firm—Morgan, Finnegan, Pine, Foley & Lee

[57] ABSTRACT

This invention relates to novel horseshoes exhibiting outstanding wearability. The horseshoes of this invention are made from titanium alloy compositions which provide a desirable combination of mechanical properties (e.g., high strength, flexibility, resiliency, good wearing qualities, abrasion resistance, workability, lightness, moldability) that makes them particularly suitable for the production of horseshoes.

The preferred titanium alloy composition for making the horseshoes of this invention is titanium alloy consisting essentially of titanium, aluminum in an amount of 6% by weight and vanadium in an amount of 4% by weight.

1 Claim, 3 Drawing Figures

HORSESHOES MADE FROM TITANIUM ALLOY COMPOSITIONS

BACKGROUND IN THE ART

Prior to this invention, it was known that the property of lightness in a horseshoe, particularly for use on racehorses and the like was a very desirable property. For this reason the most commonly used shoes for racehorses and the like are made of aluminum. While aluminum horseshoes afford the desired lightness, they do not exhibit particularly good wearability. The average life for an aluminum horseshoe for a racehorse is in the neighborhood of a month or so.

An object of this invention is to provide an improved horseshoe which affords the same desirable property of lightness as aluminum but has improved wearability.

GENERAL DESCRIPTION OF THE INVENTION

The improved titanium based compositions of this invention consist essentially of a major amount of titanium metal and a minor amount of modifying metals to provide added strength and other desirable mechanical properties. Titanium alloys that may be used for forming the horseshoe of this invention are those described on pages 524–542 of Metals Handbook, Vol I, "Properties and Selection of Metals," 8th Edition, published by American Society for Metals, 1961. A most suitable alloy for making the horseshoes of this invention is the titanium alloy described on pages 524–542 of the aforementioned Metals Handbook comprising titanium as the base metal with aluminum in an amount of 6% by weight, vanadium in an amount of 4% by weight as modifing metals.

In producing a horseshoe in accordance with this invention, any conventional procedures for forming shaped articles may be used, preferably by molding using conventional molding procedures.

SPECIFIC DESCRIPTION OF INVENTION

Figure 1:
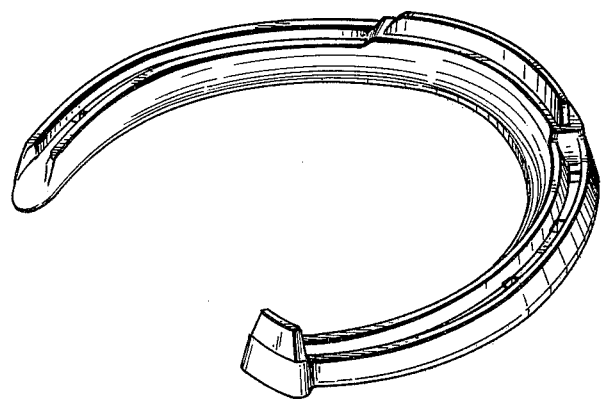
FIG. 1 shows a perspective view of a molded horseshoe of conventional shape and design made of titanium alloy in accordance with the present invention.
Figure 2:
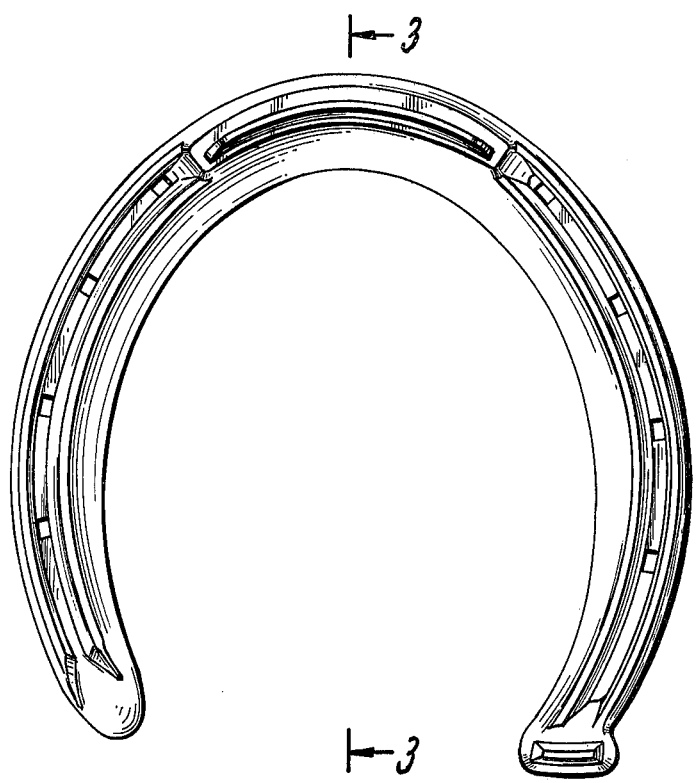
FIG. 2 is a plan view of the horseshoe.
Figure 3:
FIG. 3 is a cross-sectional view along the line 3—3 of FIG. 2.

In forming a horseshoe in accordance with the present invention, titanium alloy (6% by weight aluminum and 4% by weight vanadium) is heated in a suitable heating chamber (e.g., an extruder) to a moldable temperature (3,500° F.) and an appropriate amount of the mixture to form a horseshoe of the configuration shown in FIG. 1 is shot into a mold having a cavity of the configuration of the horseshoe shown in FIG. 1 to fill the mold. The mold is then cooled in a conventional manner after which the molded horseshoe is removed from the mold.

What is claimed is:

1. A horseshoe made from a titanium alloy composition wherein in addition to titanium as the base metal there is incorporated 6% by weight of aluminum and 4% by weight vanadium of the total alloy composition.

* * * * *